United States Patent
Heidl (10) Patent No.: US 12,466,373 B2
(45) Date of Patent: Nov. 11, 2025

(54) METHOD FOR CONTROLLING A BRAKING TORQUE OF A VEHICLE DURING AN AT LEAST PARTLY AUTOMATED TRAVERSAL OF AN INCLINE AND/OR A DECLINE, COMPUTING DEVICE, AND ASSISTANCE SYSTEM FOR A VEHICLE

(71) Applicant: Bayerische Motoren Werke Aktiengesellschaft, Munich (DE)

(72) Inventor: Christian Heidl, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 84 days.

(21) Appl. No.: 18/566,841

(22) PCT Filed: May 16, 2022

(86) PCT No.: PCT/EP2022/063124
§ 371 (c)(1),
(2) Date: Dec. 4, 2023

(87) PCT Pub. No.: WO2022/268408
PCT Pub. Date: Dec. 29, 2022

(65) Prior Publication Data
US 2024/0270220 A1 Aug. 15, 2024

(30) Foreign Application Priority Data
Jun. 21, 2021 (DE) .................... 10 2021 115 955.5

(51) Int. Cl.
*B60T 8/58* (2006.01)
*B60T 7/12* (2006.01)
(Continued)

(52) U.S. Cl.
CPC .................................... *B60T 8/58* (2013.01); *B60T 7/12* (2013.01); *B60T 8/171* (2013.01); *B60T 8/172* (2013.01);
(Continued)

(58) Field of Classification Search
CPC . B60T 8/58; B60T 8/171; B60T 8/172; B60T 7/12; B60T 7/22; B60T 2201/03;
(Continued)

(56) References Cited

U.S. PATENT DOCUMENTS

| 4,712,839 A * | 12/1987 | Brearley | B60T 13/662 |
| | | | 303/174 |
| 8,027,774 B2 * | 9/2011 | Laiou | B60T 7/22 |
| | | | 701/96 |

(Continued)

FOREIGN PATENT DOCUMENTS

DE 10 2006 056 627 A1 6/2008
DE 10 2011 100 944 A1 11/2014
(Continued)

OTHER PUBLICATIONS

International Search Report (PCT/ISA/210) issued in PCT Application No. PCT/EP2022/063124 dated Sep. 2, 2022 with English translation (5 pages).
(Continued)

Primary Examiner — George C Jin
(74) Attorney, Agent, or Firm — Crowell & Moring LLP (57) ABSTRACT

Systems, methods, and apparatuses are provided for controlling a braking torque of a vehicle while travelling in an at least semiautomated manner. Standstill data is received, while the vehicle is traveling in the at least semiautomated manner on an incline and/or a decline, when a temporary standstill of the vehicle is requested by the assistance system. Speed values are continuously received that describe a speed of the vehicle while the vehicle is decelerating prior to the temporary standstill. Slope data is continuously determined that describes an angle of the incline or decline. An amended speed value is continuously computed that depends on the speed value and the slope data. An electronic control signal is output to control the
(Continued)

braking torque to bring the vehicle to the temporary standstill when the amended speed value decreases below a predetermined threshold value and the standstill data are received.

15 Claims, 4 Drawing Sheets (51) Int. Cl.
*B60T 8/171* (2006.01)
*B60T 8/172* (2006.01)

(52) U.S. Cl.
CPC ....... *B60T 2201/03* (2013.01); *B60T 2201/04* (2013.01); *B60T 2201/06* (2013.01); *B60T 2210/20* (2013.01); *B60T 2250/04* (2013.01)

(58) Field of Classification Search
CPC ............ B60T 2201/04; B60T 2201/06; B60T 2201/02; B60W 30/181; B60W 30/18118
See application file for complete search history.

(56) References Cited

U.S. PATENT DOCUMENTS

| | | |
|---|---|---|
| 2007/0182243 A1 | 8/2007 | Osborn et al. |
| 2008/0133099 A1 | 6/2008 | Laiou et al. |
| 2011/0282558 A1 | 11/2011 | Park |
| 2013/0060433 A1* | 3/2013 | Maruyama ............ B60T 7/122 701/53 |
| 2015/0100222 A1 | 4/2015 | Beger et al. |
| 2017/0043767 A1 | 2/2017 | Khafagy et al. |
| 2018/0134292 A1 | 5/2018 | Alpman et al. |
| 2018/0222459 A1* | 8/2018 | Kelly ...................... B60T 8/00 |
| 2022/0348173 A1 | 11/2022 | Fukazawa |

FOREIGN PATENT DOCUMENTS

| | | |
|---|---|---|
| DE | 10 2013 111 063 A1 | 4/2015 |
| DE | 10 2016 114 755 A1 | 3/2017 |
| WO | WO 2021/060187 A1 | 4/2021 |

OTHER PUBLICATIONS

German-language Written Opinion (PCT/ISA/237) issued in PCT Application No. PCT/EP2022/063124 dated Sep. 2, 2022 with English translation (9 pages).
German-language Office Action issued in German Application No. 10 2021 115 955.5 dated May 2, 2022 (6 pages).

* cited by examiner

METHOD FOR CONTROLLING A BRAKING TORQUE OF A VEHICLE DURING AN AT LEAST PARTLY AUTOMATED TRAVERSAL OF AN INCLINE AND/OR A DECLINE, COMPUTING DEVICE, AND ASSISTANCE SYSTEM FOR A VEHICLE

BACKGROUND AND SUMMARY

The present subject matter relates to a method for controlling a braking torque of a vehicle while it is travelling in an at least semiautomated manner on an incline and/or a decline using an assistance system. Furthermore, the present subject matter relates to a computing device for an assistance system of a vehicle. Finally, the present subject matter relates to an assistance system for a vehicle.

Adaptive cruise control (ACC) of a vehicle is a crucial step toward automated driving. A driver of the vehicle first predefines a desired speed, which is then automatically maintained by the vehicle using the adaptive cruise control. Additional distance sensors, such as a radar sensor or a camera, moreover allow extremely comfortable driving in queuing traffic. The distance sensor allows the distance from a road user travelling ahead to be constantly monitored. If the road user travelling ahead travels more slowly, for example, the adaptive cruise control can reduce the speed predefined by the driver, which means that no intervention by the driver is needed and comfortable queued driving is still possible. Even if the vehicle travelling ahead or the road user travelling ahead accelerates, the adaptive cruise control accelerates the vehicle until the desired speed and/or the speed of the vehicle travelling ahead is reached. There can also be provision in this case for the vehicle to be briefly slowed to a standstill. This can be necessary in stop-and-go traffic or at traffic lights, for example.

A particular situation arises for the adaptive cruise control system when travelling on an incline and/or a decline. If the adaptive cruise control is activated and the vehicle travelling ahead slows to a standstill, it is necessary for the adaptive cruise control system to also slow the vehicle to a standstill. Ordinarily, the braking in this case is performed such that a braking torque or braking pressure is controlled such that the vehicle comes to a standstill as comfortably as possible. In other words, the braking torque or braking pressure is reduced shortly before the standstill, and so the vehicle is not stopped in a jerky manner.

If the vehicle is now situated on an incline or on a decline, however, it can happen that the vehicle unintentionally rolls a few centimeters on account of the reduced braking torque or the reduced braking pressure and on account of the incline or decline. The reason for this is generally that an additional braking torque that prevents the vehicle from unintentionally rolling or ensures a temporary standstill is built up only upon a threshold value for the speed being underrun. This threshold value can be 0.1 m/s, for example. Moreover, the rolling of the vehicle can be more probable during high decelerations or during hard braking.

To overcome the problem of unintentional rolling during a temporary standstill on an incline or a decline, the additional braking torque for achieving the temporary standstill can be built up earlier. In other words, the threshold value that, when underrun, results in the braking torque being built up can thus be increased. By way of example, a threshold value of 0.4 m/s instead of 0.1 m/s could thus be predefined. A disadvantage of increasing the threshold value is a reduction in comfort on the flat. Increasing the threshold value can lead to uncomfortable, jerky stopping on the flat.

The document DE 10 2006 056 627 A1 discloses a method for ensuring a standstill for a motor vehicle, in which, before the standstill is reached, an electronic control unit verifies whether a predefined incline threshold has been exceeded and whether a predefined speed-of-travel threshold has been underrun and also whether a negative vehicle acceleration (deceleration) exists. If all three conditions exist simultaneously, an increased specified braking torque is predefined until the standstill of the vehicle is reached.

The document DE 10 2011 100 944 A1 discloses a method for adaptive cruise control on an incline to improve a driving response on an incline and a response when maintaining a stopped state on an incline. During the adaptive cruise control, a gradient of a road is estimated based on a vehicle acceleration and a longitudinal acceleration in order to facilitate compensation for a moment of resistance with regard to the gradient of the road, thereby preventing a speed of travel of a vehicle on an incline from worsening. Compensation for a braking torque to prevent the vehicle from being pushed backward when the vehicle has/is stopped on an incline or when it is started on an incline in order to drive off can also prevent the response on an incline from worsening.

The laid-open specification DE 10 2016 114 755 A1 describes a vehicle that contains an engine having autostop and autostart functions. The vehicle additionally contains a brake system that is configured to apply a braking torque to vehicle wheels. The vehicle also contains a controller that is configured to control the engine and the brake system by way of an ACC system as a reaction to a detected object in front. The controller is configured to automatically control the brake system as a reaction to a distance from the detected object in front dropping below a first threshold value, defined in advance, and a vehicle speed dropping below a second threshold value, defined in advance. As a reaction to these inputs, the controller automatically controls the brake system to apply a braking torque in order to stop the vehicle steady based on a current road inclination in the absence of drivetrain torque. The controller additionally controls the engine to autostop as a reaction to these inputs.

The document DE 10 2013 111 063 A1 relates to a method for automatically stopping a vehicle, in particular a motor vehicle, on an incline, wherein a vehicle driver stops the vehicle on the incline, wherein the vehicle rolls to a stop on the incline essentially without influence from the vehicle driver, and wherein, at a time subsequent thereto, the vehicle is automatically brought to a stop position. The document also describes a computer program product, a processing device or a computing unit, and a safety device or a safety system, in particular a driver assistance system, for a vehicle, in particular a motor vehicle.

The object of the present subject matter is to provide a solution to how the control of a braking torque during at least semiautomated operation of a vehicle while it is travelling on an incline and/or a decline using an assistance system can be improved such that safe and comfortable driving is facilitated.

This object is achieved according to the present subject matter by a method, a computing device and an assistance system for a vehicle having the features. Advantageous developments of the present subject matter are also described herein.

A method according to the present subject matter is used to control a braking torque of a vehicle while it is travelling in an at least semiautomated manner on an incline and/or a decline using an assistance system. The method comprises receiving standstill data as soon as a future temporary standstill of the vehicle while it is travelling in an at least semiautomated manner on the incline and/or decline is requested by the assistance system. Furthermore, the method comprises continually receiving speed values that describe a speed of the vehicle while the vehicle is decelerating prior to the temporary standstill. Additionally, the method comprises continually determining slope data that describe an angle of the incline or decline. The method also comprises continually computing an amended speed value that is dependent on the speed value and the slope data. Finally, the method comprises outputting an electronic control signal to control the braking torque for achieving the temporary standstill of the vehicle as soon as the amended speed value decreases below a predetermined threshold value and the standstill data are received.

The method is thus intended to be used to control the braking torque provided by the brakes of the vehicle. In this case, while the vehicle is being operated in an at least semiautomated manner, the braking torque is intended to be controlled using the assistance system while the vehicle is travelling on a roadway with an incline or a decline and the vehicle is being slowed to a standstill. In particular, the method is intended to be used to prevent the vehicle from rolling when braked to a standstill, and the braking is intended to be made as comfortable as possible for a driver of the vehicle. By way of example, when travelling on an incline, it can happen that the driver of the vehicle predefines a desired speed of 30 km/h for the adaptive cruise control. Moreover, it can be the case that a road user travelling ahead reduces their speed or slows to a standstill. The adaptive cruise control can then also reduce the speed and slow to a standstill. In this case, the braking maneuver and thus the braking torque or braking pressure is controlled such that the vehicle is prevented from stopping or slowing in a jerky manner. In particular, the braking maneuver is intended to be as comfortable as possible for the driver of the vehicle as a result of the change of state from a dynamic driving state to a temporary standstill state. In addition, safety is intended to be ensured and the vehicle is intended to be prevented from rolling.

To provide sufficient braking torque that prevents the vehicle from rolling even on an incline or on a decline, it is first necessary to ascertain that a temporary standstill of the vehicle will shortly be desired. The assistance system can thus request a future temporary standstill using the standstill data. By way of example, this can take place in the form of binary information and/or distance-based information. The speed values that are continually received can be used to identify the time from which the vehicle is so slow that the vehicle is almost at a standstill and is therefore intended to be prevented from rolling.

When the state changes from the dynamic driving state to a temporary standstill state, the braking torque for achieving the standstill can be provided. This change of state can also be dependent on the slope of the roadway, however. The greater the angle of the incline or decline, the earlier a change of state that may be necessary. The reason for this is that, for example, the greater the angle of the incline, the greater the downhill force and thus the deceleration when travelling uphill. If the change of state were now to take place only when a predetermined speed is underrun, it could happen that the vehicle briefly unintentionally rolls back if the incline is great.

There is provision for the slope data that describe the angle of the incline or decline to be continually determined. The slope data can also be determined for regions of the roadway that will be travelled on by the vehicle in the future. The angle of the incline or decline can be determined for the roadway on which the vehicle is currently situated. The angle can also be determined for the region of the roadway in which the vehicle is likely to be slowed to a standstill.

The continual determination of slope data, i.e. the angle of the incline or decline, allows an amended speed value to be continually computed. The amended speed value can be used to take account of the slope during the change of state, i.e. during the change from a dynamic state to a temporary standstill state. The amended speed value can be computed such that, when travelling on an incline using an assistance system, the amended speed value decreases below the predefined threshold value earlier when compared with the speed value, as the angle of the incline increases. In other words, the amended speed value can thus be used to identify when the change of state from a dynamic driving state to a temporary standstill of the vehicle based on the slope data is intended to take place and when the braking torque to ensure the temporary standstill is therefore intended to be built up or provided.

The amended speed value can be continually determined based on the speed value, which describes the current speed of the vehicle, and the slope data. The speed value that describes the current speed of the vehicle can be determined based on a speed sensor of the vehicle. The amended speed value can be determined using a computation rule or formula that is dependent on the speed value and the slope data. A non-linear relationship between the speed value and the amended speed value can be obtained based on the angle. Moreover, there can be provision for different computation rules to be used for inclines and declines.

If the amended speed value decreases below the predetermined threshold value, the change of state from "active" to "temporary standstill" can take place and the braking torque can be provided. Compared with the prior art, the change of state thus does not take place only based on the actual speed of the vehicle. According to the present subject matter, the change of state takes place based on the amended speed value, which additionally takes account of at least the angle of the roadway. The method according to the present subject matter can therefore be used to provide the braking torque such that the vehicle is always prevented from rolling during a temporary standstill. Moreover, the braking torque can be regulated such that the braking maneuver provides the greatest possible comfort and safety for the driver of the vehicle irrespective of the slope.

In one example, acceleration data that describe an acceleration or the deceleration of the vehicle prior to the temporary standstill are additionally received and/or determined. The amended speed value can thus additionally be determined based on the acceleration data. It is advantageous if the acceleration or deceleration of the vehicle is taken into account for computing the amended speed value. If, for example when adaptive cruise control is activated, a road user travelling ahead finds it necessary to perform a hard braking maneuver, the change of state and thus the threshold value can preferably be underrun by the amended speed value much earlier than in the case of soft braking. Only in this way is it possible to ensure that the vehicle is prevented from rolling, in particular rolling back, during a temporary standstill on account of a hard braking maneuver both based on the slope and based on the acceleration of the vehicle, in particular the deceleration of the vehicle.

The acceleration data can be provided by an acceleration sensor of the vehicle. Furthermore, it is also possible for the acceleration data to be determined based on the continually received speed values. By way of example, the acceleration or deceleration of the vehicle prior to the temporary standstill can be determined by a time derivative of the speed of the vehicle. In particular, the acceleration can thus be regarded as the ratio of a speed difference and a time difference.

Further, the acceleration data can also be used to improve an estimate of the angle of the incline or decline. If the slope is measured using an acceleration sensor, for example, this measurement can be influenced by an acceleration or a deceleration of the vehicle. The acceleration data can be used to correct and therefore improve the estimate of the slope.

All in all, the acceleration data can thus be used to improve the control of a braking torque of a vehicle while it is travelling in an at least semiautomated manner on an incline and/or a decline using an assistance system. First, rolling of the vehicle is prevented, and secondly, comfort for the driver of the vehicle is improved.

Moreover, it is advantageous if the amended speed value is computed such that it decreases below the predefined threshold value earlier when compared with the speed value, as the acceleration or deceleration of the vehicle increases. If the time characteristic of the continually determined amended speed value and the time characteristic of the continually determined speed value while travelling on an incline/decline are visualized, the graph of the time characteristic of the amended speed value that lies beneath the graph of the speed value. In other words, the amended speed value is less than the speed value during a braking maneuver when travelling on an incline. It can also be said that the amended speed value leads the speed value. The amended speed value decreases below the predefined speed value earlier as the deceleration of the vehicle increases.

Another advantageous example provides for the amended speed value to be computed such that it decreases below the predefined threshold value earlier when compared with the speed value, as the angle of the incline or decline increases. Similar to the preceding example, it can thus hold that the amended speed value leads the speed value more the greater the angle of the incline or decline. By way of example, the amended speed value can differ from the speed value by a negative additive element. By way of example, the negative additive element can be in the form of a product of the acceleration or deceleration of the vehicle and an incline-dependent timing element. All in all, an amended speed value can thus be computed that takes account of both the slope and the acceleration of the vehicle. In particular, it is thus possible to increase comfort for the driver of the vehicle during a braking maneuver when travelling on an incline or a decline using the assistance system.

Another example provides for the electronic control signal to be output such that the braking torque for achieving the temporary standstill of the vehicle is higher the greater the acceleration or deceleration of the vehicle and/or the greater the angle of the incline or decline. To improve the control of the braking torque, not only the use of an amended speed value but also the use of an incline- and/or acceleration-dependent braking torque can be advantageous. By way of example, the provided braking torque for achieving the temporary standstill can be available faster the greater the angle of the incline or decline. Assuming that the braking torque for achieving the temporary standstill of the vehicle is provided when the speed threshold value of 0.1 m/s is underrun, the period of time before the vehicle rolls back in the case of an incline is reduced based on the angle of the incline. The braking torque can therefore be provided earlier or faster as the angle of the incline or decline increases. Together with the amended speed value, a particularly advantageous example of the control of the braking torque of the vehicle is thus obtained.

The braking torque can moreover be determined based on the angle and/or the deceleration. As the angle increases and/or as the deceleration increases, the braking torque can be chosen to be greater or a higher braking torque can be reserved. In principle, the characteristic of the provided braking torque can have a PTI response in order to avoid overshoots. The reserved braking torque can also be referred to as the braking torque reserve.

It is also advantageous if the slope data that describe the angle of the incline or decline are determined by receiving data from an acceleration sensor and/or digital map data. Digital map data can store decline or incline information, for example. A satellite-assisted position finding system and the digital map data can thus be used to determine the slope particularly accurately. In other words, the angle of the incline or decline can thus be determined in this way. Furthermore, the use of digital map data has the advantage that predictive driving and therefore a predictive braking maneuver and also particularly comfortable initiation of the temporary standstill are possible.

Finally, one advantageous example provides for the amended speed value to be computed if the speed value decreases below a predefined minimum speed. It can thus be advantageous to compute the amended speed value only if this is actually necessary. This allows hardware resources to be saved. In particular, it is thus possible to use computing capacities for other purposes. Computing the amended speed value is necessary for example only when a future temporary standstill is requested and the current speed decreases below a predefined minimum speed. In other words, the amended speed value is computed when the temporary standstill is immediately imminent and the braking torque for achieving the temporary standstill of the vehicle is intended to be controlled.

Another aspect of the present subject matter relates to a computing device for an assistance system of a vehicle that is configured to carry out a method according to the present subject matter. By way of example, the computing device can be provided by at least one electronic control unit.

Moreover, the present subject matter relates to an assistance system for a vehicle, comprising a computing device according to the present subject matter. In particular, the assistance system can be designed for at least automated longitudinal guidance of the vehicle. By way of example, the assistance system can be designed for adaptive cruise control (ACC), in particular with a stop-and-go function. Alternatively, or additionally, the assistance system can be configured to undertake at least the longitudinal guidance of the vehicle during maneuvers, for example parking maneuvers.

A vehicle according to the present subject matter comprises an assistance system according to the present subject matter. The vehicle can be in the form of a passenger car, in particular.

Another aspect of the present subject matter relates to a computer program, comprising instructions that, when the program is executed by a computing device, cause said computing device to carry out a method according to the present subject matter and the advantageous examples thereof. In addition, the present subject matter relates to a non-transitory, computer-readable (storage) medium, comprising instructions that, when executed by a computing device, cause said computing device to carry out a method according to the present subject matter and the advantageous examples thereof.

The preferred examples presented with respect to the method according to the present subject matter, and the advantages of said examples, apply to the computing device according to the present subject matter, to the assistance system according to the present subject matter, to the vehicle according to the present subject matter, to the computer program according to the present subject matter and to the non-transitory, computer-readable (storage) medium according to the present subject matter as appropriate.

The features and combinations of features cited in the description above and the features and combinations of features cited in the description of the figures below and/or shown in the figures alone can be used not only in the specifically indicated combination but also in other combinations or on their own without departing from the scope of the present subject matter.

DETAILED DESCRIPTION OF THE DRAWINGS

In the figures, identical or functionally identical elements are provided with the same reference signs.

Figure 1:
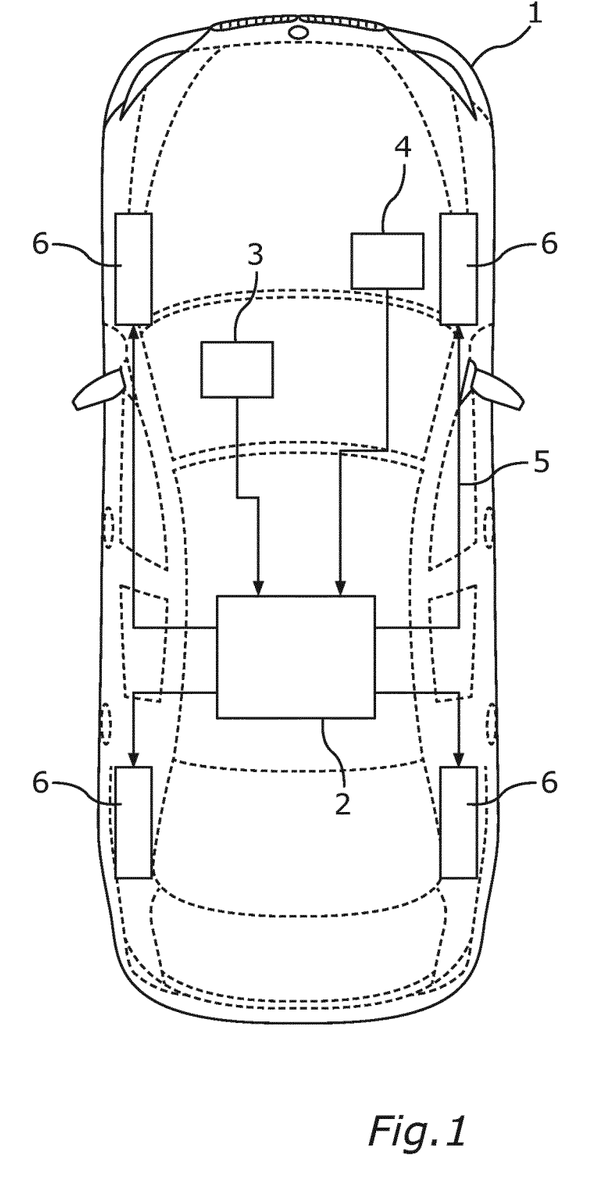
FIG. 1 shows a schematic representation of a vehicle that comprises a computing device for carrying out a method for controlling a braking torque of a vehicle.

FIG. 1 shows a schematic representation of a vehicle 1, which is in the form of a passenger car, in a plan view. The vehicle 1 comprises a computing device 2 that is used to control a braking torque of the vehicle 1 while it is travelling in an at least semiautomated manner on an incline 7 and/or a decline using an assistance system 3. The vehicle 1 or the assistance system 3 also comprises a speed sensor 4 that can be used to provide speed values vx.

By way of example, the assistance system 3 can be a system for adaptive cruise control with a stop-and-go function. The assistance system 3 can be used to regulate a speed or longitudinal speed of the vehicle 1 to a predefined desired speed. Moreover, a distance from a road user 8 travelling ahead can be regulated. The assistance system 3 can be used to reduce the speed to a temporary standstill, for example when the road user 8 travelling ahead slows.

As soon as a future temporary standstill of the vehicle 1 is required, for example because another road user 8 travelling ahead is braking, the computing device 2 can receive standstill data provided by the assistance system 3. Furthermore, the computing device 2 continually receives the speed values vx provided by the speed sensor 4 of the vehicle 1, for example. These speed values vx describe the current speed of the vehicle 1 while the vehicle 1 is decelerating prior to the temporary standstill.

The computing device 2 can also continually determine slope data that describe an angle of the incline or decline of a roadway 7. The angle of the incline or decline can be determined for example based on data from an acceleration sensor, which is not shown here, and/or based on digital map data. The angle can be determined for the current position of the vehicle 1 and/or for a region of the roadway 7 in which the standstill is likely to occur.

Based on the standstill data, the speed values vx and the slope data, the computing device 2 can continually compute an amended speed value $vx_{ge}$. This amended speed value $vx_{ge}$ can be dependent on the speed value vx and the slope data. Moreover, the amended speed value $vx_{ge}$ can be dependent on the acceleration or deceleration of the vehicle 1 prior to the standstill. If the amended speed value $vx_{ge}$ decreases below a predetermined threshold value 14 and the standstill data are received by the computing device 2, the computing device 2 can output an electronic control signal 5 to control the braking torque for achieving the temporary standstill of the vehicle 1. The braking torque can be provided by the respective brakes 6 of the vehicle 1 and can achieve the temporary standstill of the vehicle 1.

Figure 2:
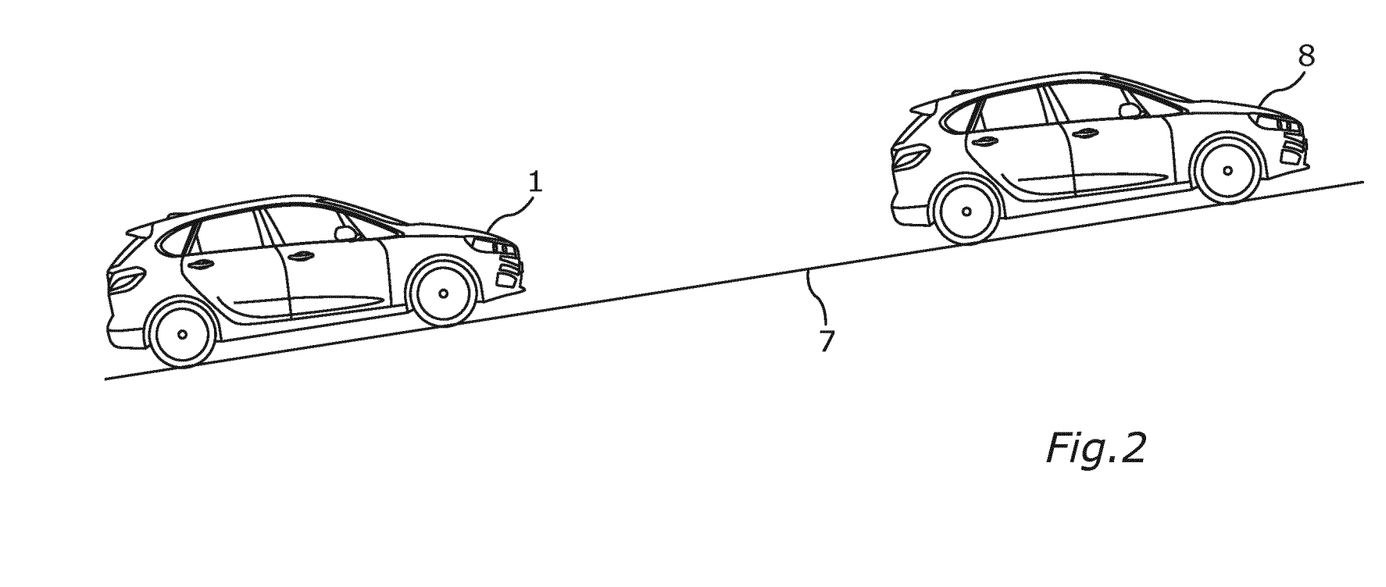
FIG. 2 shows the vehicle shown in FIG. 1 while it is travelling on an incline in combination with subsequent travel, during which another road user is in front of the vehicle.

FIG. 2 shows the vehicle 1 shown in FIG. 1 while it is travelling on a roadway 7 having an incline in combination with subsequent travel, during which another road user 8 is in front of the vehicle 1. The driver of the vehicle 1 can predefine a desired speed, for example. The assistance system 3 can automatically regulate the speed of the vehicle 1 to maintain a minimum distance from the road user 8. If the other road user 8 travelling ahead decelerates, for example, the assistance system 3 reduces the speed of the vehicle 1, so that comfortable queued driving for the driver of the vehicle 1 is possible. If the other road user 8 comes to a standstill, the assistance system 3 of the vehicle 1 can slow the vehicle 1 to a standstill.

Ordinarily, such a braking maneuver to slow the vehicle 1 to a standstill is performed such that stopping is as comfortable as possible for the driver of the vehicle 1. In particular, the slowing or stopping of the vehicle 1 is thus not intended to occur in a jerky manner. This can be achieved for example by reducing the braking torque of the vehicle 1 toward the end of the braking maneuver. If the speed of the vehicle 1 decreases below a threshold value 14, ordinarily an additional braking torque is provided that ensures the temporary standstill of the vehicle 1. When travelling on an incline and also a decline, it can happen that the temporary standstill of the vehicle 1 occurs more quickly than the braking torque for achieving the temporary standstill is present at the brakes 6 of the vehicle 1. As a result, the vehicle 1 could briefly roll back when travelling on an incline.

The computing device 2 can be used to prevent such a response by controlling the braking torque for achieving the standstill of the vehicle 1. In other words, a comfortable braking maneuver is thus firstly possible, and secondly, the temporary standstill of the vehicle 1 can be simultaneously ensured for all slopes.

Figure 3:
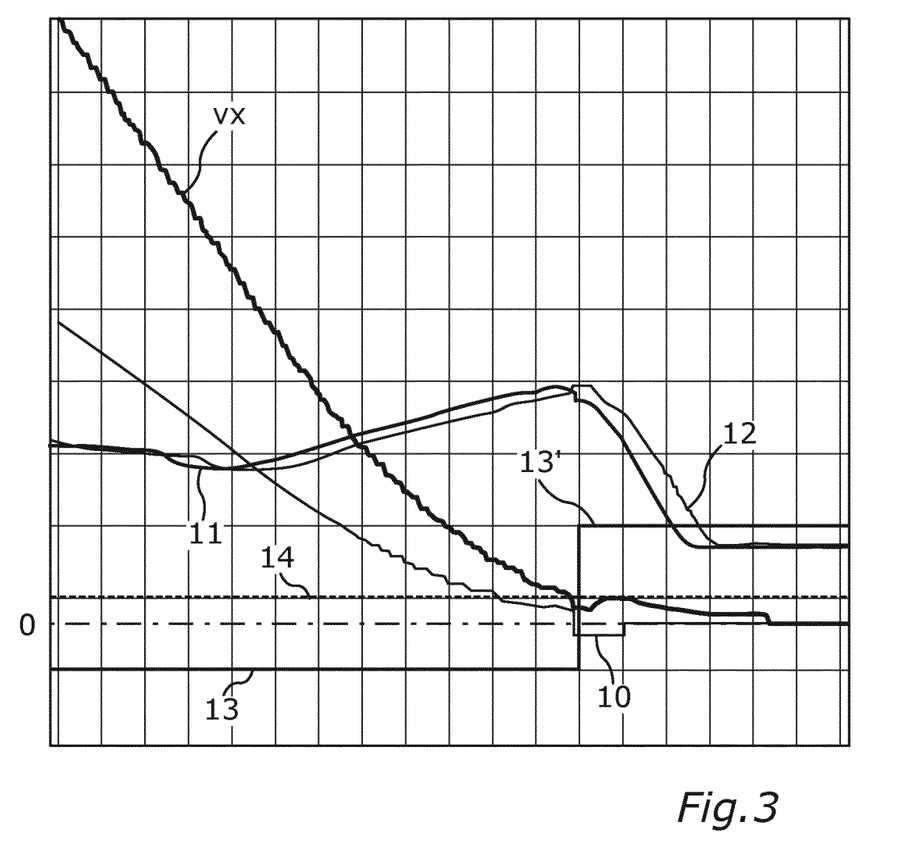
FIG. 3 shows, among other things a time characteristic of the speed of the vehicle shown in FIG. 2, wherein adaptive cruise control slows the vehicle to a standstill on account of the other road user and the vehicle rolls back on account of the incline.

FIG. 3 shows, among other things, a time characteristic of the speed values vx of the vehicle 1 shown in FIG. 2, wherein the assistance system 3 slows the vehicle 1 to a standstill on account of the other road user 8 travelling ahead and the vehicle 1 rolls back on account of the incline. Furthermore, FIG. 3 shows a time characteristic of a wheel speed 10. FIG. 3 also shows a time characteristic of a specified braking torque 11 and of an actual braking torque 12. Finally, FIG. 3 shows a state 13 associated with dynamic driving, a state 13' associated with a temporary standstill and the threshold value 14.

It can be seen that the change of state from the state 13, or the dynamic driving state, to the state 13', or the temporary standstill state of the vehicle 1, takes place precisely when the time characteristic of the speed values vx decreases below the threshold value 14. On account of the incline of the roadway 7, the vehicle 1 briefly rolls back, however. This can be identified based on the time characteristic of the wheel speed 10. The time characteristic of the wheel speed 10 is negative while the vehicle is rolling back. The time characteristic of the speed values vx of the vehicle 1 represents the absolute value of the speed and is therefore positive while the vehicle is rolling back, even though a temporary standstill is requested by the assistance system 3 of the vehicle 1.

Figure 4:
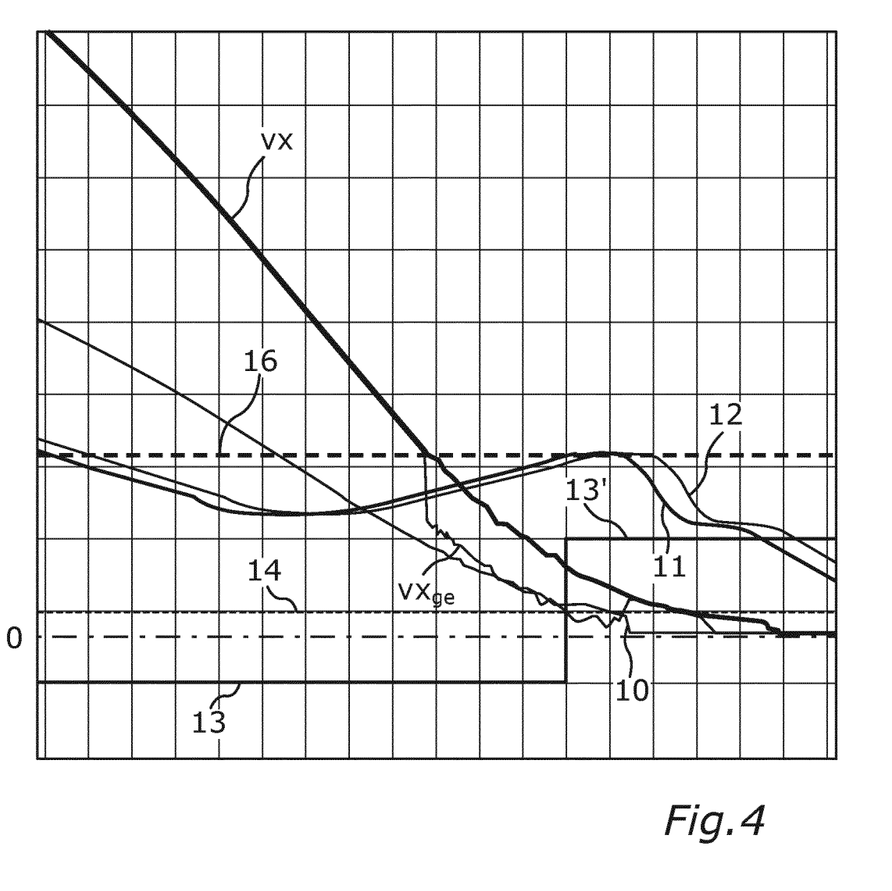
FIG. 4 shows among other things a time characteristic of the speed similarly to FIG. 3, wherein the computing device controls the braking torque of the vehicle such that the vehicle is prevented from rolling back.

FIG. 4 shows among other things a time characteristic of the speed values vx similarly to FIG. 3, wherein the computing device 2 controls the braking torque of the vehicle 1 such that the vehicle 1 is prevented from rolling back. To this end, the computing device 2 continually computes amended speed values $vx_{ge}$, the time characteristic of which is shown in FIG. 4. In the present case, the amended speed value $vx_{ge}$ is computed as soon as the speed value vx decreases below a minimum speed 16. The amended speed value $vx_{ge}$ can be continually computed using the following formula:

$$vx_{ge} = vx + ax * \Delta t.$$

Here, $\Delta t$ describes an angle-dependent timing element determined based on the slope data and ax describes the acceleration of the vehicle 1. The acceleration in this case is negative, since it is a deceleration. The addition of the vehicle acceleration ax multiplied by a time delta $\Delta t$ that can be applied on an incline-dependent basis produces a speed reserve that ends up being higher the higher the deceleration or the incline.

As soon as the time characteristic of the amended speed value $vx_{ge}$ decreases below the threshold value 14, a change of state from a dynamic driving state 13 to a temporary standstill state 13' can take place. In this case, the time characteristic of the amended speed value $vx_{ge}$ decreases below the threshold value 14 earlier than the time characteristic of the speed value vx. This allows the vehicle 1 to be prevented from rolling back. This is evident from the fact that the time characteristic of the wheel speed 10 is continuously positive. In particular, compared with FIG. 3, it can be seen that the time characteristic of the specified braking torque 11 and of the actual braking torque 12 is brought forward in time. This means that the braking torque for achieving the temporary standstill 13 of the vehicle 1 is present at the brakes 6 of the vehicle 1 precisely when the vehicle 1 comes to a standstill, or the assistance system 3, e.g., the adaptive cruise control, has slowed the vehicle.

That the change of state from a dynamic driving state to a temporary standstill of the vehicle 1 takes place extremely comfortably for the driver of the vehicle 1 is evident from the fact that the speed of the vehicle 1 is reduced slowly and steadily. In particular, the time characteristic of the speed approaches a zero value continuously and evenly:

What is claimed is:

1. A method for controlling a braking torque of a vehicle while travelling in an at least semiautomated manner on an incline and/or a decline using an assistance system, comprising:
   receiving standstill data, while the vehicle is traveling in the at least semiautomated manner on the incline and/or the decline, when a temporary standstill of the vehicle is requested by the assistance system;
   continually receiving one or more speed values that describe a speed of the vehicle while the vehicle is decelerating prior to the temporary standstill;
   continually determining slope data that describes an angle of the incline or decline;
   continually computing an amended speed value that depends on the speed value and the slope data; and
   outputting an electronic control signal to control the braking torque to bring the vehicle to the temporary standstill when the amended speed value decreases below a predetermined threshold value and the standstill data are received.

2. The method according to claim 1, further comprising:
   receiving and/or determining acceleration data that describe an acceleration or deceleration of the vehicle prior to the temporary standstill; and
   computing the amended speed value based on the acceleration data.

3. The method according to claim 2, wherein the amended speed value is computed such that the amended speed value decreases below the predetermined threshold value earlier when compared with the speed value, as the acceleration or deceleration of the vehicle increases.

4. The method according to claim 1, wherein the amended speed value is computed such that the amended speed value decreases below the predetermined threshold value earlier when compared with the speed value, as the angle of the incline or decline increases.

5. The method according to claim 1, wherein the electronic control signal is output such that the braking torque to bring the vehicle to the temporary standstill increases as the acceleration or deceleration of the vehicle increases and/or the angle of the incline or decline increases.

6. The method according to claim 1, wherein the slope data that describe the angle of the incline or decline are determined by receiving data from an acceleration sensor and/or digital map data.

7. The method according to claim 1, further comprising:
   computing the amended speed value if the speed value decreases below a predefined minimum speed.

8. A computing device for an assistance system of a vehicle travelling in an at least semiautomated manner on an incline and/or a decline using an assistance system, the computing device comprising:
   a processor; and
   a memory in communication with the processor and storing instructions executable by the processor to configure the computing device to:
   receive standstill data, while the vehicle is traveling in the at least semiautomated manner on the incline and/or the decline, when a temporary standstill of the vehicle is requested by the assistance system;
   continually receive one or more speed values that describe a speed of the vehicle while the vehicle is decelerating prior to the temporary standstill;
   continually determine slope data that describes an angle of the incline or decline;
   continually compute an amended speed value that depends on the speed value and the slope data; and
   output an electronic control signal to control the braking torque to bring the vehicle to the temporary standstill when the amended speed value decreases below a predetermined threshold value and the standstill data are received.

9. The device according to claim 8, wherein the computing device is further configured to:
   receive and/or determine acceleration data that describe an acceleration or deceleration of the vehicle prior to the temporary standstill; and
   compute the amended speed value based on the acceleration data.

10. The device according to claim 9, wherein the amended speed value is computed such that the amended speed value decreases below the predetermined threshold value earlier when compared with the speed value, as the acceleration or deceleration of the vehicle increases.

11. The device according to claim 8, wherein the amended speed value is computed such that the amended speed value decreases below the predetermined threshold value earlier when compared with the speed value, as the angle of the incline or decline increases.

12. The device according to claim 8, wherein the electronic control signal is output such that the braking torque to bring the vehicle to the temporary standstill increases as the acceleration or deceleration of the vehicle increases and/or the angle of the incline or decline increases.

13. The device according to claim 8, wherein the slope data that describe the angle of the incline or decline are determined by receiving data from an acceleration sensor and/or digital map data.

14. The device according to claim 8, wherein the computing device is further configured to:
   compute the amended speed value if the speed value decreases below a predefined minimum speed.

15. An assistance system for a vehicle, comprising:
   the computing device according to claim 8, wherein
   the assistance system is configured for at least semiautomated longitudinal guidance of the vehicle.

\* \* \* \* \*